United States Patent [19]
Ho et al.

[11] Patent Number: 5,500,943
[45] Date of Patent: Mar. 19, 1996

[54] DATA PROCESSOR WITH RENAME BUFFER AND FIFO BUFFER FOR IN-ORDER INSTRUCTION COMPLETION

[75] Inventors: Ying-wai Ho; Bradley G. Burgess, both of Austin, Tex.

[73] Assignee: Motorola, Inc., Schaumburg, Ill.

[21] Appl. No.: 442,913

[22] Filed: May 17, 1995

Related U.S. Application Data

[63] Continuation of Ser. No. 144,390, Nov. 2, 1993, abandoned.

[51] Int. Cl.$^6$ .................................................. G06F 9/30
[52] U.S. Cl. ........................................ 395/375; 364/231.8
[58] Field of Search .............................................. 395/375

[56] References Cited

U.S. PATENT DOCUMENTS

| | | | |
|---|---|---|---|
| 4,722,049 | 1/1988 | Lahti | 395/375 |
| 4,782,441 | 11/1988 | Inagami et al. | 395/200 |
| 4,992,938 | 2/1991 | Cocke et al. | 395/375 |
| 5,109,495 | 4/1992 | Fite et al. | 395/375 |
| 5,133,077 | 7/1992 | Karne et al. | 395/800 |
| 5,136,697 | 8/1992 | Johnson | 395/375 |
| 5,185,868 | 2/1993 | Tran | 395/375 |

OTHER PUBLICATIONS

Smith et al; "Implementing Precise Interrupts In Pipelined Processors" IEEE Transactions on Computers, vol. 37, No. 5, May 1988; pp. 562–573.

Sohi; "Instruction Issue Logic for High-Performance, Interruptible, Multiple functional Unit, Pipelined Computers", IEEE Transaction On Computers, vol. 39, No. 3, Mar. 1990.

Popescu et al., "The Metaflow Architecture", IEEE Micro Jun. 1991; pp. 10–13 and 63–73.

Diffendorff et al; "Organization of the Motorola 881/0 Superscaler RISC Microprocessor", IEEE Micro, vol. 12, No. 2, Apr. 1992 pp. 40–63.

*Primary Examiner*—Krisna Lim
*Attorney, Agent, or Firm*—Lee E. Chastain

[57] ABSTRACT

A data processor has first calculation circuitry (26), a rename buffer (34), and a queue (36). The first calculation circuitry generates a first and a second result from supplied operands and received programmed instructions. The rename buffer is coupled to the first calculation circuitry and stores a series of first results received from the first calculation circuitry. The rename buffer outputs the series of first results to a first predetermined register. The queue is also coupled to the first calculation circuitry and stores a series of second results. The queue outputs the sequence of second results to a second predetermined register in the same the sequence as it received the second results from the first calculation circuitry.

10 Claims, 3 Drawing Sheets

DATA PROCESSOR WITH RENAME BUFFER AND FIFO BUFFER FOR IN-ORDER INSTRUCTION COMPLETION

This application is a continuation of prior application Ser. No. 08/144,390, filed Nov. 2, 1993, now abandoned.

FIELD OF THE INVENTION

The present invention generally relates to digital computing systems, and more specifically to a data processor architecture.

BACKGROUND OF THE INVENTION

Many data processing systems are designed with reduced instruction set computer ("RISC") data processors. RISC data processors are also known as load/store data processors, for reasons which will become apparent below. RISC data processors are characterized by several features that increase their performance relative to other types of data processors.

RISC data processors predominantly execute instructions which may be broken into several discrete sequential steps. A single piece of hardware within the RISC data processor is dedicated to the execution of each one of these discrete steps. Therefore, several similar instructions, in several different phases of execution, may be simultaneously executing. This performance strategy is known as instruction pipelining.

The typical RISC data processor also concurrently executes two or more different types of instructions. A RISC data processor may concurrently execute two or more different types of instructions if it incorporates two or more different pipelines ("execution units") corresponding to two or more different classes of instructions, i.e. floating point execution unit, fixed point execution unit, branch unit, load/store unit, etc. These data processors do not wait until a first instruction completes before beginning a second instruction. They begin executing an instruction as soon as there is a pipeline stage available to accept the instruction. Some concurrent execution data processors begin two or more instructions each clock cycle. These data processors are described as "superscalar."

The combination of instruction pipelining and multiple execution units allows a RISC data processor to perform many different instructions simultaneously.

One disadvantage associated with RISC data processors is the complexity arising from the different latencies associated with the various instructions that the data processor executes. Instruction latency is the time, typically measured in machine clock cycles, that each instruction takes to produce a result or perform a function. For performance reasons, each pipeline is optimized to minimize the time each instruction takes to produce a result. However, not all instructions produce a result in the same amount of time. As a result, a fast instruction, such as a fixed point add, may finish before a slow instruction, such as a floating point multiply, even when the slow instruction begins earlier. This scenario is referred to as "out-of-order completion." Out-of-order completion must be accounted for either by software or in the hardware itself if the data processor is to maintain a coherent programming model.

Two hardware solutions for out-of-order completion are the rename buffer (or reorder buffer) and the history buffer. The rename buffer temporarily stores the result of each instruction as it is generated by an execution unit. This step is known as instruction write-back. The rename buffer will write the result of a particular instruction to the appropriate architectural register when all instructions preceding the particular instruction have written their results to the appropriate architectural registers. This step is known as instruction completion or retirement. A rename buffer masks the out-of-order execution from the architectural registers. A history buffer stores the data held in each register immediately before some instruction modifies the register. The computer can restore the state of the data processor for any predetermined time by loading the contents of the history buffer into the appropriate architectural registers if, for instance, the data processor receives an interrupt.

Both hardware solutions to the out-of-order completion problem, themselves, suffer disadvantages. The rename buffer, for instance, is shared between several, if not all, execution units within a data processor. However, not all execution units generate the same size data results. For instance, some execution units modify special purpose registers in addition to or in place of the architectural registers. These special purpose registers are handled separately from the ordinary architectural registers. Also, the value of a special purpose register may be some function of a particular instruction and the result of an immediately preceding instruction of the same type, a "sticky bit". Consequently, the rename buffer oftentimes is enlarged so that it suits all possible instruction results and is combined with an elaborate pointer circuit to identify the last special purpose register result of a particular class of instruction. Such a solution may be an expensive addition to a RISC data processor.

BRIEF DESCRIPTION OF THE DRAWINGS

The features and advantages of the present invention will be more clearly understood from the following detailed description taken in conjunction with the accompanying FIGURES where like numerals refer to like and corresponding pans and in which.

DETAILED DESCRIPTION OF A PREFERRED EMBODIMENT

Figure 1:
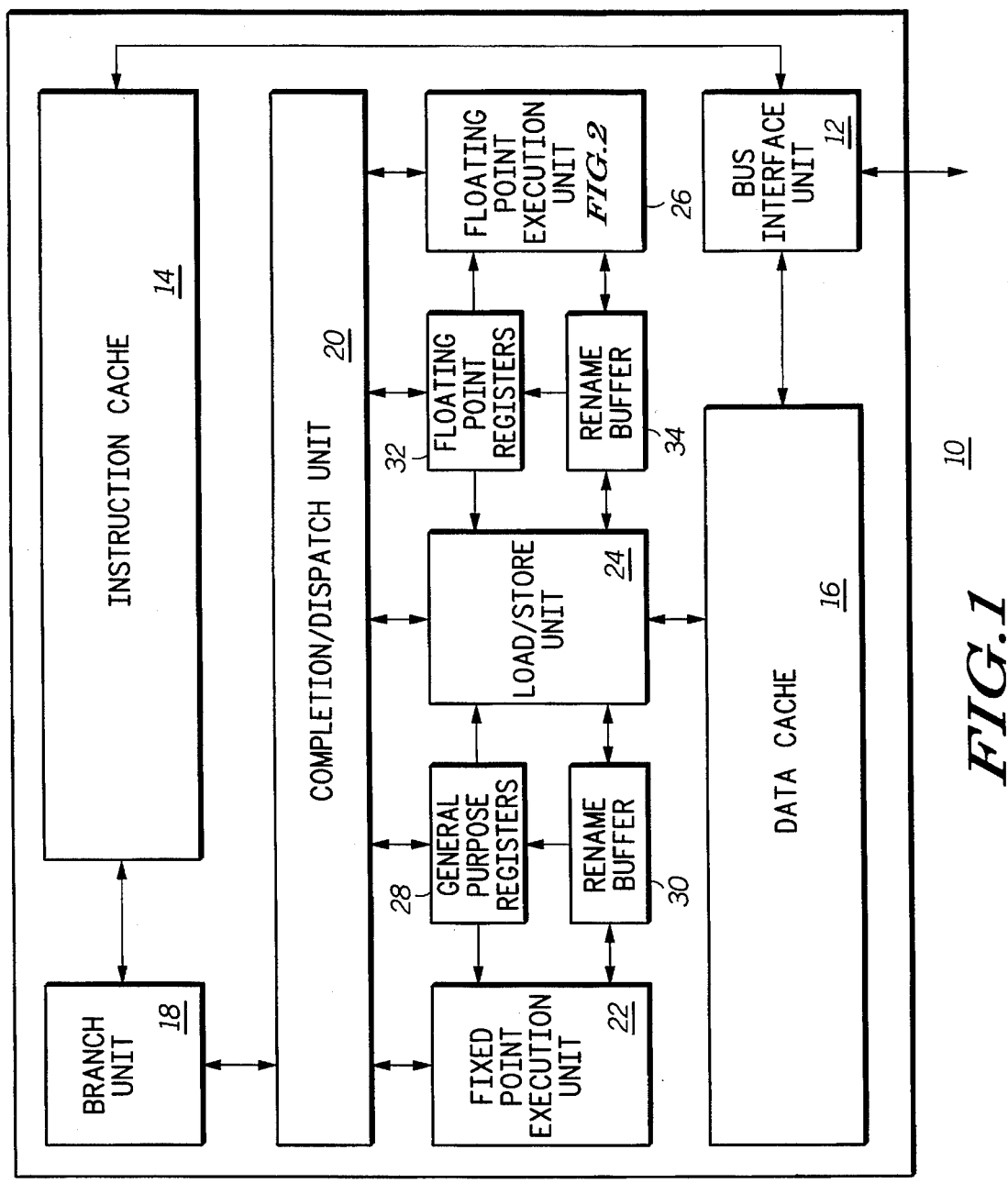
FIG. 1 depicts a block diagram of a data processor constructed in accordance with the present invention.

FIG. 1 depicts a block diagram of a data processor 10 constructed in accordance with the present invention. Data processor 10 is a RISC microprocessor that solves its out-of-order instruction completion problem by incorporating a rename buffer. As described above, the result of a particular instruction is initially written to one of the entries of the rename buffer after it is generated by an execution unit. This updating is known as instruction write-back. The appropriate architectural register is then updated with the stored result when all instructions preceding the particular instruction have updated their designated architectural registers. This updating is known as instruction completion. According to the disclosed invention, not all of the results of a particular execution unit are stored in the rename buffer. Instead, a portion of the execution unit's results are stored in a first-in-first-out ("FIFO") queue. In the depicted embodiment, the FIFO queue is an integral part of the execution unit that generates the data stored within the queue.

The disclosed combination of a rename buffer and a FIFO queue has several advantages over the known art.

First, in the depicted embodiment, the rename buffer is shared between two execution units. Both of these execution units generate a result destined for an entry in the architectural register file. However, one execution unit also generates an execution unit-specific status register result. This second result is not used by any other execution units. Therefore, this second result is stored in the disclosed FIFO queue instead of in the rename buffer. The size of each entry of the rename buffer may then be minimized so that each entry of the rename buffer is only as large as each entry of the architectural register file.

Second, a particular execution unit that generates the status register result occasionally may not generate a result destined for the architectural register file and may be the only execution unit that manipulates the result. In the first case, this execution unit does not access the rename buffer at all. In the second case, no other execution unit accesses the control register. Consequently, contention for both writeback resources is eased. A given sized rename buffer or FIFO queue may then support a larger number of simultaneously executing instructions. Conversely, a given number of simultaneously executing instructions may be supported by a rename buffer or FIFO queue with fewer entries. It should be understood that the number of entries in the rename buffer and in the FIFO queue are not dependent upon each other.

Finally, certain computing standards require that data processors maintain cumulative or "sticky" bits. Typically these sticky bits are part of the execution unit-specific status register result. These cumulative bits are sticky because they are a function of a particular instruction and of a preceding instruction of the same general type. For instance, certain sticky bits may indicate the data overflow and underflow conditions in a series of floating point arithmetic instructions. If any instruction causes such an underflow or overflow, then the instruction generating the condition and every subsequent instruction will have a sticky bit corresponding to a data overflow or underflow condition, as appropriate. As described above, the execution unit-specific status register result and, hence, the sticky bits are stored in the FIFO queue. The resultant sticky bit may be quickly determined for a particular instruction by logically ORing the value of the sticky bit of the particular instruction and the sticky bit of the youngest or most recently generated entry of the FIFO queue. Heretofore, a complex circuit was required to identify the appropriate entry in the rename buffer on which to base the sticky bit calculation.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a branch unit 18 and to a completion/dispatch unit 20. Completion/dispatch unit 20 forwards individual instructions to an appropriate execution unit. Data processor 10 has a fixed point execution unit 22, a load/store execution unit 24, and a floating point execution unit 26. Floating point execution unit 26 is more fully described below in connection with FIG. 2. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

The operation of data processor 10 without the disclosed FIFO queue is known in the art. In general, branch unit 18 determines what sequence of programmed instructions is appropriate given the contents of certain data registers and the program steps themselves. Completion/dispatch unit 20 issues the individual instructions to the various execution units 22, 24 and 26. Each of the execution units performs one or more instructions of a particular class of instructions. The particular class of instructions of each execution unit is indicated by the name of the execution unit. For instance, floating point execution unit 26 executes floating point arithmetic instructions.

Fixed point execution unit 22 returns the results of its operations to designated entries in first rename buffer 30. First rename buffer 30 periodically updates an entry of GPR file 28 with an entry from first rename buffer 30 when all instructions preceding the instruction that generated the result have updated their GPR file entries. Completion/dispatch unit 20 coordinates this updating. Both first rename buffer 30 and GPR file 28 can supply operands to fixed point execution unit 22. Conversely, floating point execution unit 26 returns the results of its operations to designated entries in second rename buffer 34. Second rename buffer 34 periodically updates an entry of FPR file 32 with an entry in second rename buffer 34 when all instructions preceding the instruction that generated the result have updated their FPR file entries. Completion/dispatch unit 20 also coordinates this updating. Both second rename buffer 34 and FPR file 32 supply operands to floating point execution unit 26.

Load/store unit 24 reads data stored in GPR file 28, first rename buffer 30, FPR file 32 or second rename buffer 34 and writes the selected data to data cache 16. This data may also be written to an external memory system (not depicted) depending upon operating characteristics of data processor 10 not relevant to the disclosed invention. Conversely, load/store unit 24 reads data stored in data cache 16 and writes the read data to GPR file 28, first rename buffer 30, FPR file 32 or second rename buffer 34.

The operation of data processor 10 with a FIFO queue is described below in connection with FIGS. 2 and 3. In general, an execution unit, here floating point execution unit 26, generates a first result that modifies an entry in FPR file 32 and a second result that modifies an execution unit-specific status register, or a floating point status control register (hereafter simply FPSCR). Examples of such an instruction are the floating point multiply-add instructions from the PowerPC Architecture instruction set. However, floating point execution unit 26 also executes certain instructions that do not modify any entry in FPR file 32. These instructions only modify the FPSCR. Examples of such an instruction are the floating point compare instructions from the same instruction set. As described above, data processor 10 temporarily stores the first result, when generated, in second rename buffer 34 and the second result in a FIFO queue during instruction write-back. Data processor 10 moves the first result to FPR file 32 and the second result to the FPSCR at instruction completion.

Figures 2, 3:
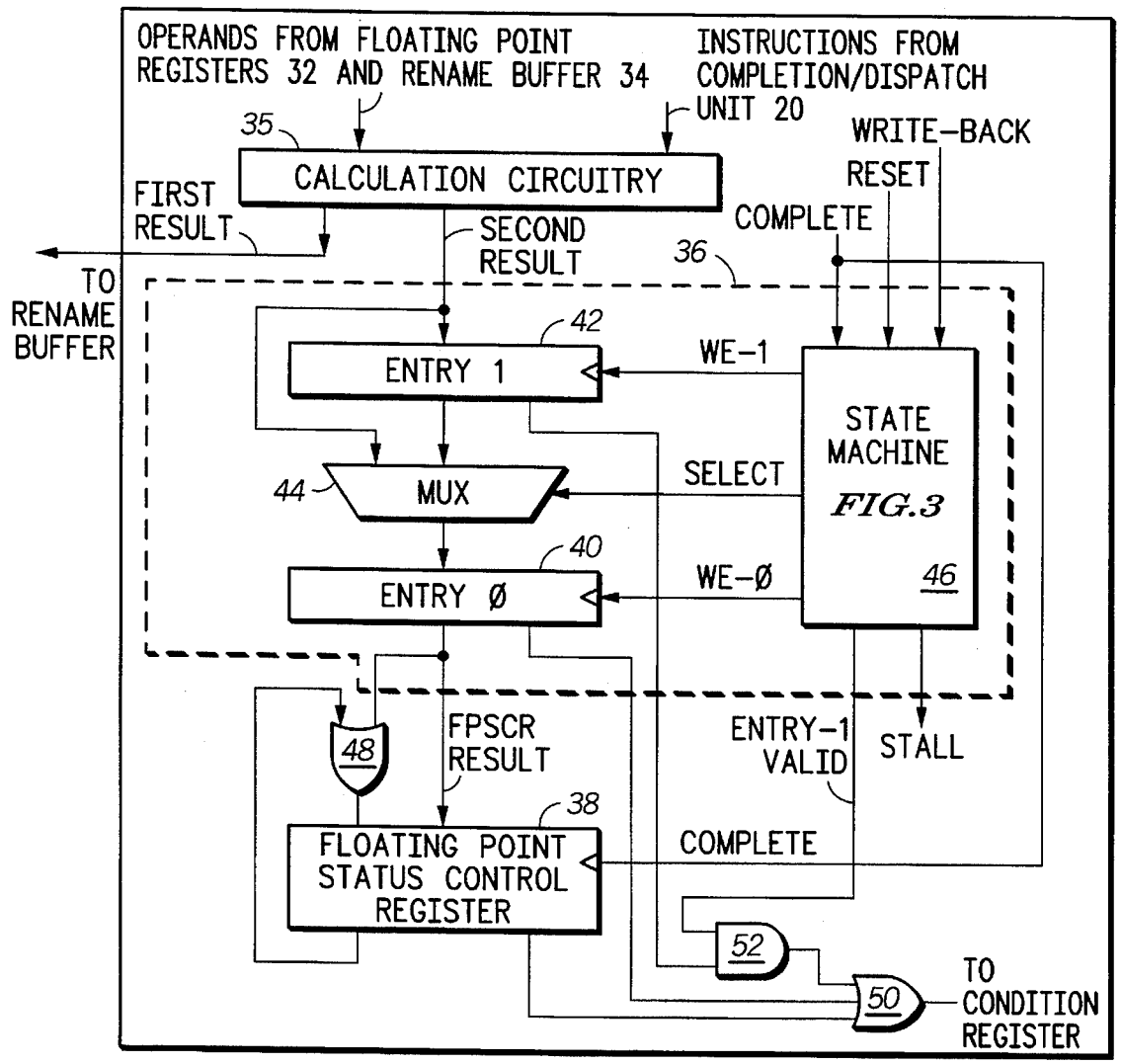
FIG. 2 depicts a block diagram of the floating point execution unit depicted in FIG. 1.
FIG. 3 depicts a state-transition diagram of the state machine depicted in FIG. 2.

FIG. 2 depicts a block diagram of floating point execution unit 26 depicted in FIG. 1. Floating point execution unit 26 has calculation circuitry 35, a FIFO queue 36, a floating point status control register (labeled and hereafter FPSCR) 38 and various logic gates used to generate certain cumulative or sticky bits of the data stored in FPSCR 38 and certain bits of a condition register (not shown).

Calculation circuitry 35 receives a sequence of instructions from completion/dispatch unit 20 and associated operands from FPR file 32 and second rename buffer 34. In the depicted embodiment, calculation circuitry 35 performs a fused-multiple-add ((A*B)+C) operation. Calculation circuitry 35 generates the two results described above. The first one of these results (the result of floating point calculation) is destined for second rename buffer 34 (via the data path labeled TO RENAME BUFFER) and, ultimately, for FPR file 32. The second result (the floating point status control register) is input to FIFO queue 36. FIFO queue 36 also receives the control signals COMPLETE, RESET, WRITE-BACK. FIFO queue 36 forwards its output (labeled FPSCR RESULT) to FPSCR 38. FIFO queue 36 generates the control signals ENTRY-1 VALID and STALL.

In operation, FIFO queue 36 receives and stores each FPSCR result associated with a sequence of floating point instructions. The control signal inputs to FIFO queue 36 determine when FIFO queue 36 latches each new FPSCR result. The calculation circuitry asserts the control signal WRITE-BACK each time it completes an instruction. FIFO queue 36 latches a second result coincident with the assertion of WRITE-BACK. Meanwhile, first rename buffer 34 receives and stores each first result of the sequence of floating point instructions (however, not all instructions generate a first result). Generally, the sequence of first results is not stored in any reoccurring order in second rename buffer 34. This precludes the use of a simple algorithm to determine which rename buffer entry is the oldest, youngest, etc.

FIFO queue 36 outputs its stored second results to FPSCR 38 in the same sequence as FIFO queue 36 received them. The control signal inputs to FIFO queue 36 determine when FIFO queue 36 outputs its oldest second result. FIFO queue 36 outputs the oldest second result to FPSCR 38 coincident with the assertion of the control signal COMPLETE. FIFO queue asserts the control signal STALL when its internal queue is full. Floating point execution unit 26 will not begin any other instructions until FIFO queue 36 de-asserts the control signal STALL.

In the depicted embodiment, FIFO queue 36 is a two entry FIFO buffer and second rename buffer 34 is a four entry buffer. FIFO queue 36 has a first latching element 40 (labeled ENTRY 0), a second latching element 42 (labeled ENTRY 1), a multiplexer 44 (labeled MUX) and a state machine circuit 46. The second result generated by the calculating circuitry is coupled to an input of second latching element 42 and to a first input of multiplexer 44. An output of second latching element 42 is coupled to a second input of multiplexer 44. An output of multiplexer 44 is coupled to an input of first latching element 40. An output of first latching element 40 generates the output of FIFO queue 36, FPSCR RESULT. State machine 46 receives the control signals COMPLETE, RESET, and WRITE-BACK and generates the control signals WE-0, WE-1, ENTRY-1 VALID, and STALL.

During operation, first latching element 40 and second latching element 42 latch the data present on their inputs when state machine circuit 46 asserts the control signals WE-0 and WE-1, respectively. Otherwise, first latching element 40 and second latching element 42 maintain previously latched data. State machine circuit 46 stores each received second result in first latching element 40 unless that element is already storing valid data. State machine circuit 46 moves a particular second result from second latching element 42 to first latching element 40 once the data in first latching element 40 has been forwarded to FPSCR 38. State machine circuit 46 forwards data from second latching element 42 to first latching element 40 by asserting the control signals SELECT and WE-0. The operation of state machine circuit 46 is described below in connection with FIG. 3.

Continuing with FIG. 2, an output of an OR gate 48 generates a cumulative or sticky bit in FPSCR 38. Cumulative bits may be used to record a wide variety of error conditions within a sequence of instructions. For instance, a cumulative bit may indicate an invalid operation such as division or multiplication by zero or infinity or a rounding error within one or more instructions. A first input of OR gate 48 receives the Nth bit of first latching element 40, where N is an integer index. A second input of OR gate 48 receives the Nth bit of FPSCR 38. Consistent with the logic table of an OR gate, the Nth bit of FPSCR 38 will be asserted beginning with the first FPSCR RESULT that asserts the Nth bit and ending when FPSCR 38 is explicitly de-asserted by other circuitry (not shown).

An output of an OR gate 50 generates a bit stored in a global CONDITION REGISTER (not shown). A CONDITION REGISTER is used, for instance, in branch instructions to determine if the branch should be taken or not taken. For early branch prediction purposes, it is important that certain bits be forwarded to the CONDITION REGISTER as early as possible. In the depicted embodiment, the condition register is updated at instruction write-back, before instruction completion. A first input of OR gate 50 receives an output of an AND gate 52. A second input of OR gate 50 receives the Mth bit of FPSCR 38, where M is an integer index. A third input of OR gate 50 receives the Mth bit of first latching element 40. A first input of AND gate 52 receives the control signal ENTRY-1 VALID. A second input of AND gate 52 receives the Mth bit of second latching element 42. In some instances, the bit output to the CONDITION REGISTER (the Mth bit) may be the same cumulative bit described above (the Nth bit). For purposes of clarity, however, the two bits are described separately.

FIG. 3 depicts a state-transition diagram of state machine circuit 46 depicted in FIG. 2. State machine circuit 46 may be in one and only one of three states (labeled and hereafter STATE 1, STATE 2 and STATE 3). State machine circuit 46 resets to STATE 1 coincident with the assertion of the control signal RESET. Otherwise, state machine circuit 46 transitions between the three states as a function of the controls signals WRITE-BACK and COMPLETE.

STATE 1 corresponds to an empty FIFO queue 36. While in STATE 1, state machine circuit 46 asserts the control signals SELECT and WE-0 and de-asserts the control signals ENTRY-1 VALID, STALL and WE-1. State machine circuit 46 transitions from STATE 1 to STATE 2 when the control signals WRITE-BACK and COMPLETE are asserted and de-asserted, respectively. (In the depicted embodiment, an asserted signal is synonymous with a logic level one.)

STATE 2 corresponds to a half full FIFO queue 36. While in STATE 2, state machine circuit 46 asserts the control signal WE-1 and de-asserts the control signals ENTRY-1 VALID, STALL and WE-0. State machine circuit 46 remains in STATE 2 when the control signals WRITE-BACK and COMPLETE are both asserted. State machine circuit 46 transitions from STATE 2 to STATE 3 when the control signals WRITE-BACK and COMPLETE are asserted and de-asserted, respectively. State machine circuit 46 transitions from STATE 2 to STATE 1 when the control signals WRITE-BACK and COMPLETE are de-asserted and asserted, respectively.

STATE 3 corresponds to a full MFO queue 3,5. While in STATE 3, state machine circuit 46 asserts the control signals ENTRY-1 VALID and STALL and de-asserts the control signals WE-0 and WE-1. State machine circuit 46 transitions from STATE 3 to STATE 2 when the control signals WRITE-BACK and COMPLETE are de-asserted and asserted, respectively.

Figure 4:
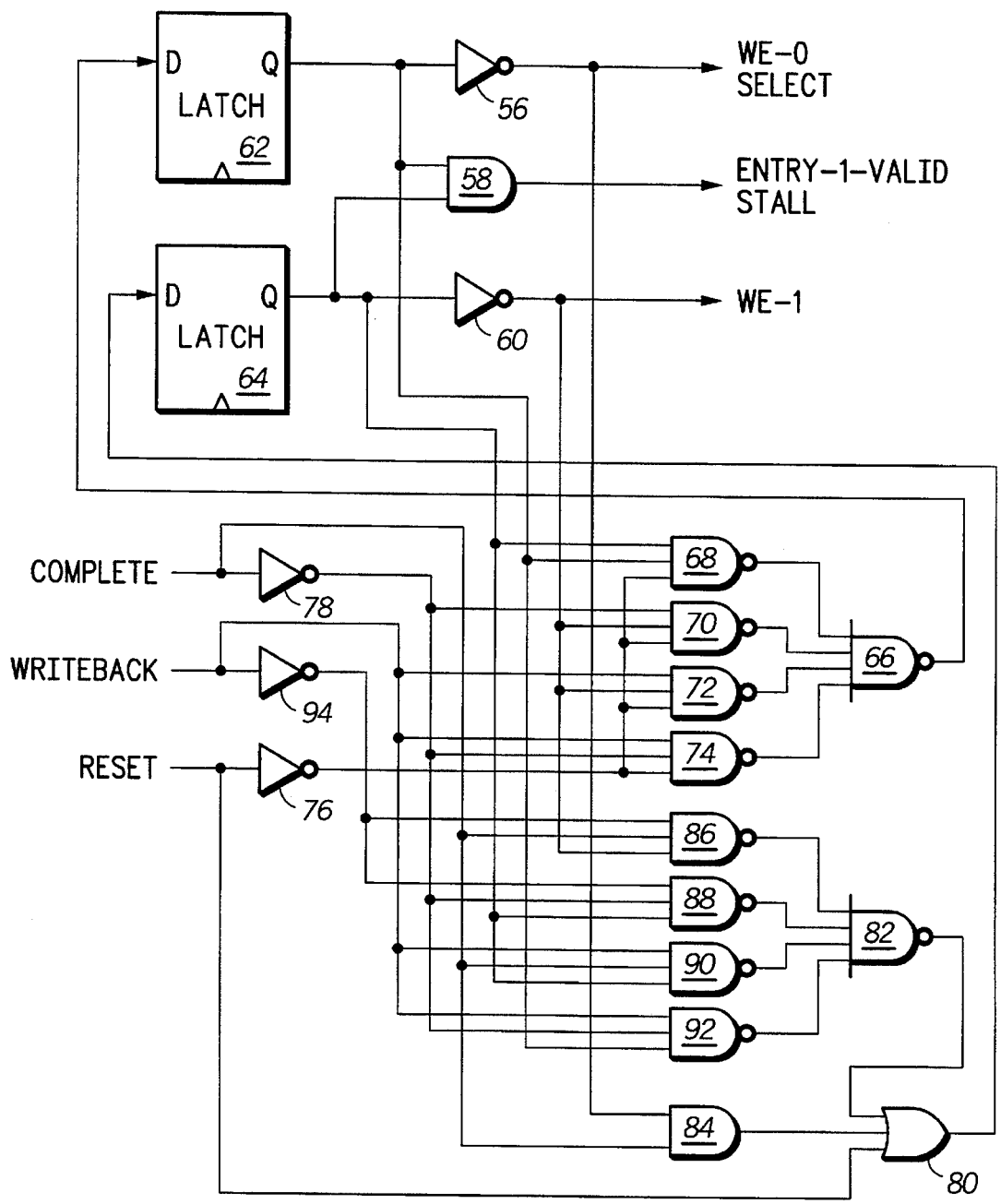
FIG. 4 depicts a block diagram of the state machine depicted in FIG. 1.

FIG. 4 depicts a block diagram of state machine 46 depicted in FIG. 1. FIG. 4 depicts one of numerous equivalent embodiments of a circuit that generates the control signals depicted in FIG. 3. An output of an inverter 56 generates the control signal WE-0 and SELECT. An output of an AND gate 58 generates the control signals ENTRY-1 VALID and STALL. An output of an inverter 60 generates the control signal WE-1. An input of inverter 54 is connected to the data (Q) output of a latch 62. A first input of AND gate 58 is connected to the data output of latch 62. A second input of AND gate 58 is connected to a data output (D) of a latch 64. An input of inverter 60 is connected to the data output of latch 64. Latches 62 and 64 are clocked by a periodic clocking signal (not shown).

An input of latch 62 is connected to an output of a four-input NAND gate 66. A first input of NAND gate 66 is connected to an output of a three-input NAND gate 68. A second input of NAND 66 gate is connected to an output of a three-input NAND gate 70. A third input of NAND gate 66 is connected to an output of a three-input NAND gate 72. A fourth input of NAND gate 66 is connected to an output of a three-input NAND gate 74. A first, a second, and a third input of NAND gate 68 are connected to the data output of latch 64, to the data output of latch 62, and to an output of an inverter 76, respectively. An input of inverter 76 receives the control signal RESET. A first, a second, and a third input of NAND gate 70 are connected to an output of an inverter 78, to the output of inverter 60, and to the output of inverter 76, respectively. An input of inverter 78 receives the control signal COMPLETE. A first, a second, and a third input of NAND gate 72 receive the control signal WRITE-BACK, are connected to the output of inverter 60, and are connected to the output of inverter 76, respectively. A first, a second, and a third input of NAND gate 74 receive the control signal WRITEBACK, are connected to the output of inverter 78, and are connected to the output of inverter 76, respectively.

An input of latch 64 is connected to an output of a three-input OR gate 80. A first, a second, and a third input of OR gate 80 are connected to the output of a four-input NAND gate 82, to an output of a two-input AND gate 84, and receives the control signal RESET, respectively. A first input of NAND gate 82 is connected to an output of a three-input NAND gate 86. A second input of NAND 82 gate is connected to an output of a three-input NAND gate 88. A third input of NAND gate 82 is connected to an output of a three-input NAND gate 90. A fourth input of NAND gate 82 is connected to an output of a three-input NAND gate 92. A first, a second, and a third input of NAND gate 86 are connected to an output of an inverter 94, receive the control signal COMPLETE, and are connected to the output of inverter 60, respectively. An input of inverter 94 receives the control signal WRITEBACK. A first, a second, and a third input of NAND gate 88 are connected to the output of inverter 94, to the output of inverter 78, and to the data output of latch 64, respectively. A first, a second, and a third input of NAND gate 90 receive the control signal WRITE-BACK, receive the control signal COMPLETE, and are connected to the data output of latch 64, respectively. A first, a second, and a third input of NAND gate 92 receive the control signal WRITEBACK, are connected to the output of inverter 78, and are connected to the data output of latch 62, respectively. A first, and a second input of AND gate 84 are connected to the output of inverter 56 and receive the control signal COMPLETE, respectively.

Although the present invention has been described with reference to a specific embodiment, further modifications and improvements will occur to those skilled in the art. For instance, the disclosed invention may be incorporated into data processors traditionally classified as complex instruction set computers or CISC machines. Also, the disclosed invention may be used in conjunction with other or more execution units than are depicted. Finally, although the second rename buffer and FIFO queue in the depicted embodiment have a specific size, the disclosed invention is not limited to any particular sizes. It is to be understood therefore, that the invention encompasses all such modifications that do not depart from the spirit and scope of the invention as defined in the appended claims.

What is claimed is:

1. A data processor comprising:

first calculation circuitry generating a plurality of pairs of results from a plurality of sets of supplied operands and received programmed instructions, each one of the plurality of pairs of results comprising a first and a second result, the received programmed instructions being a subset of an instruction stream, the first calculation circuitry generating the plurality of pairs of results in an out-of-order sequence with respect to a sequence of the instruction stream;

a rename buffer coupled to the first calculation circuitry, the rename buffer storing a series of first results received from the first calculation circuitry, the rename buffer outputting the series of first results to a first predetermined register according to the sequence of the instruction stream; and a queue coupled to the first calculation circuitry, the queue storing the series of second results, the queue outputting the series of second results to a second predetermined register according to the sequence of the instruction stream.

2. The data processor of claim 1 further comprising circuitry for logically ORing a Nth bit of a predetermined one of the series of second results and a Nth bit of the second predetermined register, where N is an integer index, to generate a cumulative value of the Nth bit of the predetermined register, the cumulative value of the Nth bit representing the occurrence of a predetermined condition in at least one of the series of second results.

3. The data processor of claim 1 wherein the first results received from the calculation circuitry are represented in floating point notation.

4. The data processor of claim 1 further comprising:

second calculation circuitry coupled to the rename buffer, the second calculation circuitry generating a third result from supplied operands and received programmed instructions; and wherein the rename buffer stores a series of third results received from the second calculation circuitry, the rename buffer outputting the series of third results to the first predetermined register according to the sequence of the instruction stream.

5. The data processor of claim 1 wherein the queue comprises:

a first latching element storing a received second result responsive to a first control signal, the first latching element generating a first output;

multiplexer circuit selectively outputting one of a received second result or the first output responsive to a second control signal, the multiplexer circuit generating a second output;

a second latching element coupled to the multiplexer circuit, the second latching element storing the second output responsive to a third control signal, the second latching element generating the series of second results; and state machine circuitry generating the first, second and third control signals.

6. The data processor of claim 1 wherein a number of entries in the rename buffer is not equal to a number of entries in the queue.

7. A data processor comprising:

first calculation circuitry generating a first and a second series of results from supplied operands and received programmed instructions, the received programmed instructions being a subset of an instruction stream, the first calculation circuitry generating the first and second series of results in an out-of-order sequence with respect to the instruction stream;

a rename buffer coupled to the first calculation circuitry, the rename buffer storing a series of first results received from the first calculation circuitry, the rename buffer outputting the series of first results to a first predetermined register, according to the sequence of the instruction stream;

a queue coupled to the first calculation circuitry, the queue storing the series of second results, the queue outputting the series of second results to a second predetermined register according to the sequence of the instruction stream, the queue buffer comprising:

a first latching element storing a received second result responsive to a first control signal, the first latching element generating a first output;

a multiplexer circuit selectively outputting one of a received second result or the first output responsive to a second control signal, the multiplexer circuit generating a second output;

a second latching element coupled to the multiplexer circuit, the second latching element storing the second output responsive to a third control signal, the second latching element outputting the second series of results to the second predetermined register; and a state machine circuitry generating the first, second and third control signals.

8. The data processor of claim 7 further comprising circuitry for logically ORing a Nth bit of a predetermined one of the series of second results and a Nth bit of the second predetermined register, where N is an integer index, to generate a cumulative value of the Nth bit of the predetermined register, the cumulative value of the Nth bit representing the occurrence of a predetermined condition in at least one of the series of second results.

9. The data processor of claim 8 further comprising:

second calculation circuitry coupled to the rename buffer, the second calculation circuitry generating a third result from the supplied operands and the received programmed instructions; and wherein the rename buffer stores a series of third results received from the second calculation circuitry, the rename buffer outputting the series of third results to the first predetermined register.

10. The data processor of claim 7 further comprising:

second calculation circuitry coupled to the rename buffer, the second calculation circuitry generating a third result from the supplied operands and the received programmed instructions; and wherein the rename buffer stores a series of third results received from the second calculation circuitry, the rename buffer outputting the series of third results to the first predetermined register.

\* \* \* \* \*